O. KYLIN.
CLUTCH.
APPLICATION FILED MAR. 27, 1918.
1,309,761.
Patented July 15, 1919.
2 SHEETS—SHEET 1.
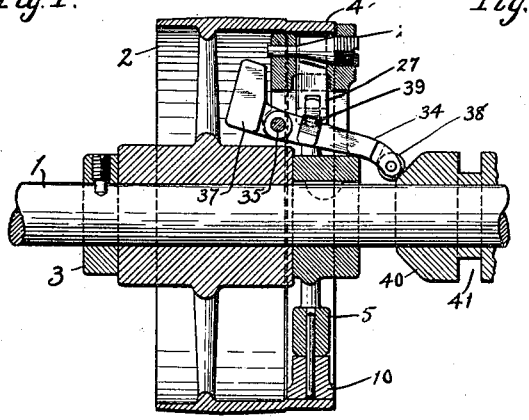
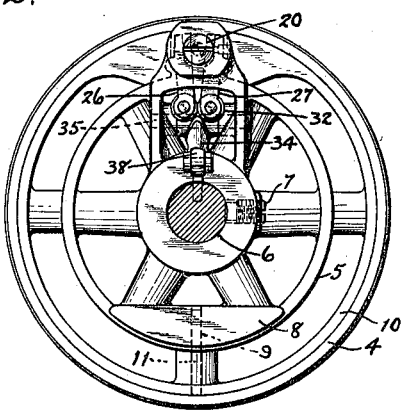
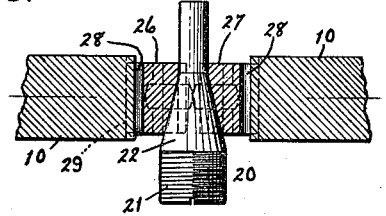
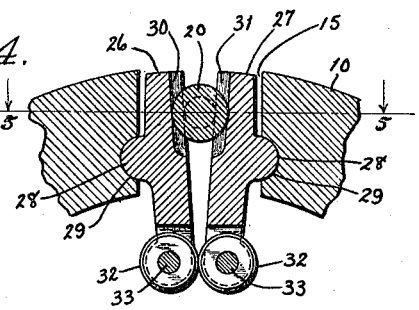
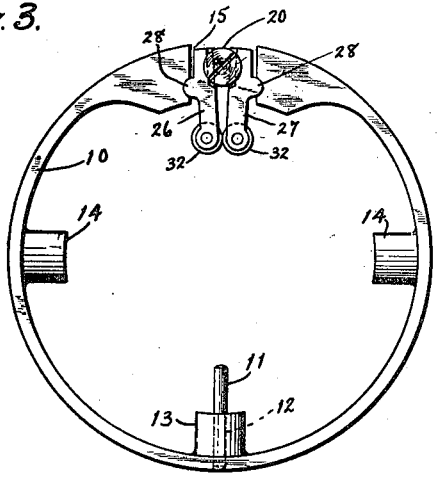
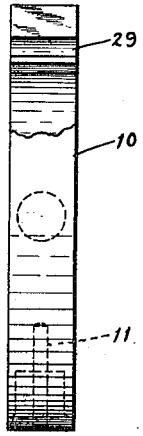
Witness
C. A. Towsley.
Inventor
Oskar Kylin
By Louis C. Vanderlip
Attorney O. KYLIN.
CLUTCH.
APPLICATION FILED MAR. 27, 1918.
1,309,761. Patented July 15, 1919.
2 SHEETS—SHEET 2.
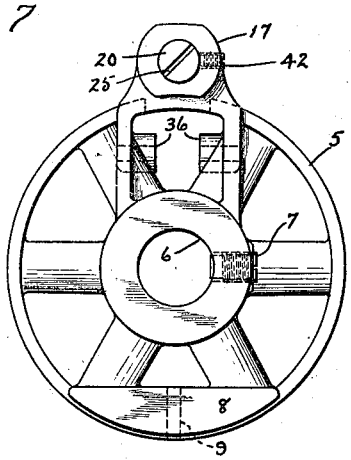
Fig 7
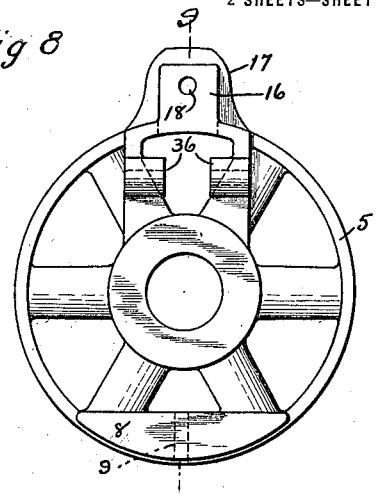
Fig 8
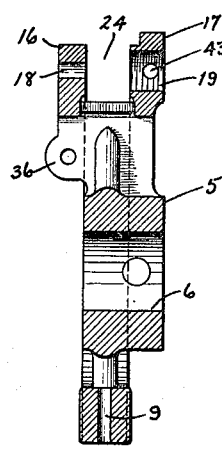
Fig 9
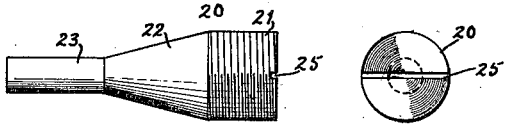
Fig 10
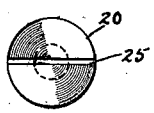
Fig 11
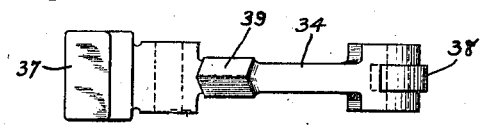
Fig 15
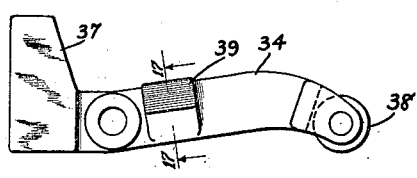
Fig 16
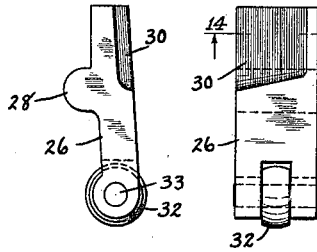
Fig 12  Fig 13
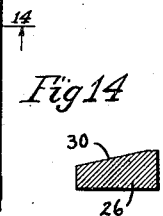
Fig 14
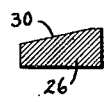
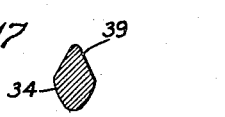
Fig 17
Witness
C. A. Towsley.
Inventor
Oskar Kylin
By Louis C. Vanderlip.
Attorney

UNITED STATES PATENT OFFICE.

OSKAR KYLIN, OF ELKHART, INDIANA, ASSIGNOR TO FOSTER MACHINE COMPANY, OF ELKHART, INDIANA, A CORPORATION OF INDIANA.

CLUTCH.

1,309,761.   Specification of Letters Patent.   Patented July 15, 1919.

Application filed March 27, 1918. Serial No. 224,936.

*To all whom it may concern:*

Be it known that I, OSKAR KYLIN, a subject of the King of Sweden, but a declarant of intention of becoming a citizen of the United States, residing in the city of Elkhart, county of Elkhart, Indiana, have invented certain new and useful Improvements in Clutches, of which the following is a specification.

This invention relates to clutch mechanism, and more especially to improvements in expanding ring clutches.

An object of my invention is the production of an expanding ring clutch having improved means for actuating the clutch ring into engagement with the clutch drum. Another object of the invention is the production of a clutch of the character described in which improved means for clutch ring adjustment are incorporated, whereby wear on the ring and clutch drum may be taken up. Other objects of my invention are mentioned and described herein.

The preferred embodiment of my invention is illustrated in the accompanying drawings in which Figure 1 is a longitudinal section of the clutch and loose pulley and clutch drum to which the application of the invention is made; Fig. 2 is a side elevation of the clutch, pulley and drum; Fig. 3 is a side elevation of an assembly of the clutch ring and its expanding members; Fig. 4 is a fragment showing the clutch ring ends and expanding members somewhat enlarged and in section; Fig. 5 is a section taken on the line 5—5 of Fig. 4; Fig. 6 is an end elevation of one side of the clutch ring shown in Fig. 3; Fig. 7 is a side elevation of one side of the clutch ring carrier or driver member; Fig. 8 is a side elevation of the opposite side of the clutch ring carrier member; Fig. 9 is a section taken on the line 9—9 of Fig. 8; Fig. 10 is a view of the adjustable fulcrum pin; Fig. 11 is an end view of the fulcrum pin; Fig. 12 is a side elevation of one of the clutch ring expanding levers; Fig. 13 is a view of the member shown in Fig. 12 taken at right angles; Fig. 14 is a section taken on the line 14—14 of Fig. 13; Fig. 15 is an edgewise view of the main clutch actuation lever and roller; Fig. 16 is a side elevation of the same lever; and Fig. 17 is a section taken on the line 17—17 of Fig. 16.

Similar numerals of reference indicate similar members and parts of members throughout the several views on the drawings.

Referring to the drawings in detail, the numeral 1 indicates a driving shaft upon which a pulley member 2 is loosely mounted, being confined against longitudinal movement on the shaft by a collar 3 which is rigidly fastened to the shaft, said pulley having a clutch drum 4 at one side thereof the inner periphery whereof is adapted to be engaged by the expansible clutch ring hereinafter described. The numeral 5 indicates an annular clutch ring carrier or driver member which is bored at 6 for rigid mounting upon the shaft 1 by a set screw 7, or may be fastened by other suitable means. The numeral 8 indicates a counter balance on the carrier 5 and provided with a radially extending aperture 9 formed therethrough. Numeral 10 indicates an annular split expansible clutch ring mounted upon the carrier member 5 and driven thereby through a pin 11 which is arranged in a pin socket 12 formed in the lug 13 of said ring 10, said pin projecting into the aperture 9 of the carrier member 5. The split clutch ring 10 is normally self contractible, being provided with a plurality of stop lugs 14, 14 adapted to engage the outer periphery of the driver member 5 to limit the inward contractile movement of said clutch ring. The ends of the clutch ring 10 are spaced from each other to form a gap 15 within which gap a pair of coöperating clutch ring expanding fingers, or levers, hereinafter described, are arranged. The numerals 16 and 17 indicate a pair of radially extending brackets carried on the outer periphery of the driver member 5, said brackets being transversely and axially apertured at 18 and 19, respectively, said apertures being cylindrical in formation, the latter aperture being substantially greater in diameter than the former and screw threaded. Numeral 20 indicates a fulcrum pin provided with a cylindrical screw threaded end portion 21, a conical or tapered intermediate portion 22, and a relatively smaller cylindrical end portion 23, the portion 21 engaging the threaded bracket aperture 19 of said carrier 5 and the opposite end 23 of said pin being slidably arranged in the aperture 18 of the carrier bracket 16. The tapered portion 22 of the pin 20 is arranged within and transversely of the gap 24 and between the brackets 16 and 17. The numeral 25 indicates a slot formed transversely of the end of the pin portion 21 and is adapted to be engaged by a tool for rotating, and thereby adjusting, the pin 20 within its bearings 18 and 19. The numerals 26 and 27 indicate a pair of coöperating clutch ring expanding fingers, or levers, gripped within the clutch ring gap 15 by the contractile clutch ring 10, each of said levers having a transverse tongue 28 which is pivotally arranged within a corresponding tongue socket 29 formed in an adjacent clutch ring end, both of the fingers being otherwise spaced from the clutch ring ends to permit of some pivotal action by the fingers.

The numerals 30 and 31 indicate converging sloping faces formed transversely of and adjacent the outer ends of the fingers 26 and 27, respectively, and above the pivot point 28 of each finger, said sloping faces being adapted to bear upon the opposite sides of the tapered portion 22 of the fulcrum pin 20 and confined thereon by the contractile pressure exerted by the clutch ring 10. The inner end of each of the fingers 26 and 27 is forked and carries a roller 32 carried on a pin 33 mounted in the lever fork, said rollers being held in yieldable engagement with each other by the compression of the clutch ring exerted on the tongues 28, 28, in which position the outer periphery, same being the friction surface, of the clutch ring 10 is spaced from the inner periphery of the clutch drum 4.

The numeral 34 indicates an actuating lever pivotally mounted upon a pin 35 which is carried in the bearing bosses 36, 36 formed in the driver member 5 and positioned beneath the bracket 16, said lever being adapted to swing in a radial plane, and adapted also, when outwardly and radially actuated, to actuate or spread the fingers 26 and 27, as hereinafter described. The lever 34 is provided with a counter balance 37 which is centrifugally actuated when the driver 5 is rotated, whereby the opposite end of the lever 34, upon which is mounted a roller 38, is inwardly projected and normally maintained, thereby disposing the roller 38 adjacent the shaft 1. The lever 34 is provided also with a wedge 39 intermediate the pivot pin 35 and the roller 38 and adapted to engage between the lever rollers 32, 32 when the lever 34 is outwardly and radially actuated by a cone member 40 slidably mounted upon the shaft 1 and adapted to be projected against said lever roller 38. The cone member 40 may have a shifter lever groove 41 which may be engaged by any suitable form of shifting lever (not shown) for sliding the cone back and forth on the shaft 1.

When wear occurs by virtue of the frictional engagement between the clutch ring 10 and the inner periphery of the drum 4 a means for adjusting the clutch ring to take up such wear is provided, this being done by a slight expansion of the clutch ring and is effected by a partial, or full, rotation of the fulcrum pin 20. Obviously, the rotation of the pin 20 causes the tapered fulcrum portion 22 of the pin 20 to travel toward the bracket 16, whereby outward pressure is exerted against the sloping lever faces 30 and 31, which pressure is transmitted to the clutch ring ends through the tongues 28, 28, thereby slightly widening the ring gap 15 and expanding the ring. The numeral 42 indicates a set screw mounted in the threaded aperture 43 of the bracket 17 and adapted to engage the pin 20 to prevent adjustment displacement thereof.

In practice, the pulley 2 is usually connected by belt with a main line shaft, or motor, from which it takes power, in which event the shaft 1 carries a driving pulley (not shown) connected by belt (not shown) with the machine to be driven, and in which case the pulley 2 runs free on the shaft 1 until clutch ring expansion is effected and the drum 4 engaged thereby. But, obviously, this rule of practice may be reversed and the pulley 2 may thereby become a driven member for power transmission through the shaft 1.

I claim:

1. In a clutch, a shaft; a drum revolubly mounted upon the shaft; a carrier member rigidly mounted upon said shaft; a split expansible clutch ring mounted upon the carrier member and arranged within said drum; a plurality of clutch ring expanding levers fulcrumed in said carrier member and operatively connected with the clutch ring adjacent its opposing ends; an actuating member mounted in the carrier member and adapted to move radially thereof, said actuating member being adapted also to engage between said expanding levers when outwardly radially actuated for actuating said levers apart; centrifugally actuated means carried by said actuating member for normally effecting disengagement between it and said expanding levers; and means for outwardly radially actuating said actuating member between said expanding levers, whereby clutch ring expansion is effected.

2. In a clutch, a shaft; a drum revolubly mounted upon the shaft; a carrier member rigidly mounted upon said shaft; a split expansible and normally contractile clutch ring mounted upon said carrier member and within said drum, the clutch ring ends being spaced apart; a pair of coöperating substantially radially arranged clutch ring expanding levers fulcrumed in said carrier member and arranged between the clutch ring ends, said levers being gripped by said clutch ring ends and operatively connected therewith at the point where gripped; an actuating lever pivoted in the carrier member and adapted to swing radially thereof, said actuating lever being adapted also to engage between said expanding levers when outwardly radially actuated; centrifugally actuated means carried by said actuating lever for normally effecting disengagement between it and said expanding levers; and means for outwardly radially actuating said actuating lever between said expanding levers, whereby clutch ring expansion is effected.

In testimony whereof I have hereunto affixed my signature this 21st day of March, 1918.

OSKAR KYLIN.

Copies of this patent may be obtained for five cents each, by addressing the "Commissioner of Patents, Washington, D. C."